US011251669B2

(12) United States Patent
Flower

(10) Patent No.: US 11,251,669 B2
(45) Date of Patent: Feb. 15, 2022

(54) COOLING ARRANGEMENT FOR A GENERATOR

(71) Applicant: SAFRAN ELECTRICAL & POWER, Blagnac (FR)

(72) Inventor: Paul David Flower, Buckinghamshire (GB)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 17/043,973

(22) PCT Filed: Mar. 28, 2019

(86) PCT No.: PCT/EP2019/057959
§ 371 (c)(1),
(2) Date: Sep. 30, 2020

(87) PCT Pub. No.: WO2019/197172
PCT Pub. Date: Oct. 17, 2019

(65) Prior Publication Data
US 2021/0036565 A1 Feb. 4, 2021

(30) Foreign Application Priority Data
Apr. 10, 2018 (GB) ...................................... 1805929

(51) Int. Cl.
*H02K 1/32* (2006.01)
*B64D 33/08* (2006.01)
(Continued)

(52) U.S. Cl.
CPC ............... *H02K 1/32* (2013.01); *B64D 27/02* (2013.01); *B64D 33/08* (2013.01); *B64D 41/00* (2013.01);
(Continued)

(58) Field of Classification Search
CPC .... H02K 1/32; H02K 9/19; F02K 9/64; F01D 5/081; F01D 5/085; B64D 33/08
(Continued)

(56) References Cited

U.S. PATENT DOCUMENTS

| 3,648,085 A | * | 3/1972 | Fujii | ......................... H02K 9/19 |
| | | | | 310/54 |
| 7,021,905 B2 | * | 4/2006 | Torrey | ...................... F04C 2/18 |
| | | | | 290/52 |

(Continued)

FOREIGN PATENT DOCUMENTS

| EP | 0652627 A1 | 5/1995 | |
| EP | 0942516 A2 * | 9/1999 | ............... H02K 9/19 |

(Continued)

OTHER PUBLICATIONS

International Search Report and Written Opinion, PCT/EP2019/057959, dated May 13, 2019, 19 pages.
(Continued)

*Primary Examiner* — Charles Reid, Jr.
(74) *Attorney, Agent, or Firm* — Rankin, Hill & Clark LLP

(57) ABSTRACT

A generator arranged to be driven by an aircraft engine. The generator including a rotor. The rotor includes an inlet for receiving a fluid, a plurality of outlets configured to release the fluid from a radially outer region of the rotor, and a fluid distribution arrangement arranged to direct fluid from the inlet to one or more of the plurality of outlets. The fluid distribution arrangement is configured to selectively distribute fluid to one or more of the plurality of outlets in dependence on an operational parameter of the rotor.

19 Claims, 6 Drawing Sheets

(51) Int. Cl.
  *H02K 9/19*   (2006.01)
  *F02K 9/64*   (2006.01)
  *F01D 5/08*   (2006.01)
  *B64D 27/02*  (2006.01)
  *B64D 41/00*  (2006.01)
  *H02K 7/18*   (2006.01)

(52) U.S. Cl.
  CPC ............ *F01D 5/081* (2013.01); *F01D 5/085* (2013.01); *F02K 9/64* (2013.01); *H02K 7/1823* (2013.01); *H02K 9/19* (2013.01)

(58) Field of Classification Search
  USPC ......................................................... 290/52
  See application file for complete search history.

(56) References Cited

U.S. PATENT DOCUMENTS

| | | | | |
|---|---|---|---|---|
| 9,316,152 | B2* | 4/2016 | Subbareddyar | ........... F02C 7/18 |
| 2006/0239812 | A1 | 10/2006 | Friedel et al. | |
| 2011/0311349 | A1 | 12/2011 | Rousselin | |
| 2017/0198589 | A1* | 7/2017 | Burford | ................ F01D 11/003 |
| 2018/0026504 | A1 | 1/2018 | Huang et al. | |

FOREIGN PATENT DOCUMENTS

| | | | |
|---|---|---|---|
| EP | 0942516 | A2 | 9/1999 |
| EP | 1821392 | A2 | 8/2007 |
| JP | 2011-010489 | A | 1/2011 |
| JP | 2011010489 | A * | 1/2011 |
| JP | 2014-230393 | A | 12/2014 |
| JP | 2014230393 | A * | 12/2014 |
| JP | 2017-057901 | A | 3/2017 |

OTHER PUBLICATIONS

Great Britain Search Report, GB 1805929.5, dated Sep. 27, 2018, 4 pages.

* cited by examiner

COOLING ARRANGEMENT FOR A GENERATOR

BACKGROUND TO THE INVENTION

The present invention relates to a rotor assembly for use in a generator for an aircraft engine. In particular, the invention relates to an optimised fluid distribution arrangement, for use in cooling generators connected to aircraft engines.

Electrical generators have both an operating temperature range (within which they can operate) and an optimum temperature range (within which they operate most efficiently). In use, electrical generators create heat due to inefficiencies in generation. Electrical generators are typically cooled by a circulating fluid to ensure that they are kept within their operating temperature range, and preferably kept within their optimum temperature range.

Aircraft propulsion systems typically comprise an engine, such as a turbine or jet engine, which may be connected to an electrical generator. The electrical generator is typically formed of an assembly of magnetic circuit components, comprising a rotor and a stator. Generally, aircraft engine electrical generators are cooled using a cooling fluid—typically oil for large aircraft generators—by spraying the cooling fluid out of jets in the rotor to cool the stator. As the rotor rotates, the fluid expelled from the rotor can leave the rotor at very high absolute velocities, carrying significant kinetic energy out of the rotor, which can reduce generator efficiency. To minimise this effect, the fluid is typically ejected backwards, that is, in the opposite direction to the rotation of the rotor, to counteract the circumferential or tangential component of the movement and thus minimise the absolute velocity of the fluid.

The mechanical power consumption of the rotor jets varies with the square of the jet velocity, and so it is also desirable to balance the jet velocity with the rotor velocity in order to minimise the mechanical power consumption of the rotor. In constant speed generators, this is easily achieved by adjusting the hole size and angle of the jets, and thus the mechanical power consumption of the rotor jets in constant speed generators is typically very low—a few hundred watts.

In variable frequency generators, where there is wide range of rotor speeds, the holes of the jets need to be large enough to evacuate a sufficient flow rate of the fluid from the rotor at its minimum speed, and hence minimum centrifugal pumping force. This sets the velocity of the jets relative to the rotor at a low value, due to the larger required diameter of the jets. This results in more residual kinetic energy being left in the fluid, as it leaves the rotor. Consequently, the mechanical power consumption of the rotor is very high, and in certain circumstances can be in the kilowatt range due to the rotor imparting large absolute velocities to the fluid.

Therefore, an improved way of regulating the distribution of fluid to rotor jets is required.

SUMMARY OF THE INVENTION

A first aspect of the present invention provides a rotor for a generator arranged to be driven by an aircraft engine, the rotor comprising an inlet for receiving a fluid, a plurality of outlets configured to release the fluid from a radially outer region of the rotor, and a fluid distribution arrangement arranged to direct fluid from the inlet to one or more of the plurality of outlets, wherein the fluid distribution arrangement is configured to selectively distribute fluid to one or more of the plurality of outlets in dependence on an operational parameter of the rotor.

By selectively distributing fluid to the fluid outlets of a fluid, the rate at which fluid is ejected from the rotor can be regulated in order to minimise impact of the fluid on the stator, as well as minimising the mechanical power consumption by the rotor.

The plurality of outlets may comprise a first set of outlets, and a second set of outlets. The fluid distribution arrangement may then be configured to distribute the fluid to the first set of outlets when the operational parameter of the rotor is within a first range of values, and distribute the fluid to the second set of outlets when the operational parameter of the rotor is within a second range of values.

The fluid distribution arrangement is preferably configured to distribute the fluid to both the first and second sets of outlets when the operational parameter of the rotor is within the second range of values.

The first range of values may be above a first threshold value, and the second range of values may be below the first threshold value. The second range of values may also be below a different threshold value.

The fluid distribution arrangement may also be configured to distribute the fluid to a third set of outlets when the operational parameter of the rotor is within a third range of values. The third range of values may be below a second threshold value, wherein the second threshold value is below the first threshold value.

It will be appreciated that the fluid distribution arrangement may have any number of further sets of outlets, each set of outlets coming into operation when the operational parameter is in a particular range of values. For example, the fluid distribution arrangement may comprise an outlet for each magnetic pole on the rotor.

The operational parameter of the rotor may be the rotational velocity of the rotor. For example, the fluid distribution arrangement may be configured to distribute the fluid to the first set of outlets when the rotational velocity is above a threshold velocity, and distribute the fluid to the first and second set of outlets when the rotational velocity is below a threshold velocity.

For example, the threshold velocity may be set at the cruising speed for the particular generator. In a four pole variable frequency generator, the cruise speed may correspond to a rotational velocity of approximately 19,000 to 20,000 RPM. In a six pole variable frequency generator, the cruise speed may correspond to a rotational velocity of approximately 13,000 RPM. Setting the threshold velocity so as to correspond to the cruising speed of the generator allows the outlets to be optimised for efficiency at this speed, with the second set of outlets only being used when the generator is operating below this speed (for example, take-off, landing, ground taxiing), which is generally a much smaller proportion of the total time an aircraft is in operation. Where a third set of outlets are used, said third set may come into operation a little below cruise speed.

As such, for a four pole variable frequency generator, the first range of values may be a velocity of 19,000 RPM and above, and the second range of values may be a velocity up to 19,000 RPM. Where the fluid distribution arrangement comprises a third set of outlets, the second range of values may be a velocity of around 16,000 RPM up to 19,000 RPM, and the third range of values may be a velocity up to 16,000 RPM.

For a six pole variable frequency generator, the first range of values may be a velocity of 13,000 RPM and above, and the second range of values may be a velocity up to 13,000 RPM. Where the fluid distribution arrangement comprises a third set of outlets, the second range of values may be a velocity of around 10,000 RPM up to 13,000 RPM, and the third range of values may be a velocity up to 10,000 RPM.

As noted above, the fluid distribution arrangement may have a number of further sets of outlets which come into operation each time the rotational velocity drops below a certain value, such that as the speed decreases, the number of outlets to which fluid is being distributed increases.

As such, the rate at which fluid is released from the outlets can be matched with the rate at which the rotor is rotating. This helps to minimise the impact on the stator by the fluid as it is released at all speeds of the rotor, as well as minimise the mechanical power consumption of the rotor.

The fluid distribution arrangement may comprise a cavity for receiving fluid from the inlet.

The fluid distribution arrangement may further comprise a plurality of fluid paths configured to direct fluid from the cavity to the plurality of outlets. Preferably, at least one of the plurality of fluid paths comprises an inlet opening for receiving fluid from the cavity.

In cases where the plurality of outlets comprises a first set of outlets, and a second set of outlets, the fluid distribution arrangement may further comprise a first set of fluid paths configured to direct fluid to the first set of outlets, and a second set of fluid paths configured to direct fluid to the second set of outlets.

The first set of fluid paths may comprise a first set of inlet openings arranged at a first radial position within the cavity, and the second set of fluid paths may comprise a second set of inlet openings arranged at a second radial position within the cavity.

Preferably, the radial distance of the first set of inlet openings from the axis of rotation of the rotor is greater than the radial distance of the second set of inlet openings from the axis of rotation of the rotor. Consequently, when the rotor is moving at high rotational speeds, the centrifugal forces generated by the rotor generate increased outward radial pressure driving the fluid out radially from the rotor through the outlets faster than it can be replenished. This causes the equilibrium position which the surface of the fluid reaches in the cavity to move radially outward beyond the second set of inlet openings such that the fluid only flows into the first set of inlet openings, and thus fluid is only fed to the first set of outlets. As only a subset of the outlets are being fed with fluid, this will increase the speed at which fluid leaves the rotor, reducing the net velocity of the fluid and hence power consumption. When the rotor is moving at slower speeds, the centrifugal forces are weaker and so the fluid will also reach the second set of inlet openings. As such, fluid is fed to both the first and second set of outlets, thereby reducing the rate at which fluid is released from the outlets to better match the rotational velocity of the rotor.

The first set of outlets may be arranged at different circumferential or radial positions on the rotor to the second set of outlets.

The plurality of outlets may comprise at least one jet configured to eject fluid from the rotor. Each outlet may comprise a jet.

The rotor may comprise a plurality of inlets for receiving fluid.

A second aspect of the present invention provides a generator arranged to be driven by an aircraft engine, the generator comprising a rotor as described above.

A third aspect of the present invention provides an aircraft engine comprising a generator as described above.

A fourth aspect of the present invention provides an aircraft comprising an aircraft engine as described above.

BRIEF DESCRIPTION OF THE DRAWINGS

Further features and advantages of the present invention will become apparent from the following description of embodiments thereof, presented by way of example only, and by reference to the drawings, wherein.

DETAILED DESCRIPTION OF PREFERRED EMBODIMENTS

Figure 1:
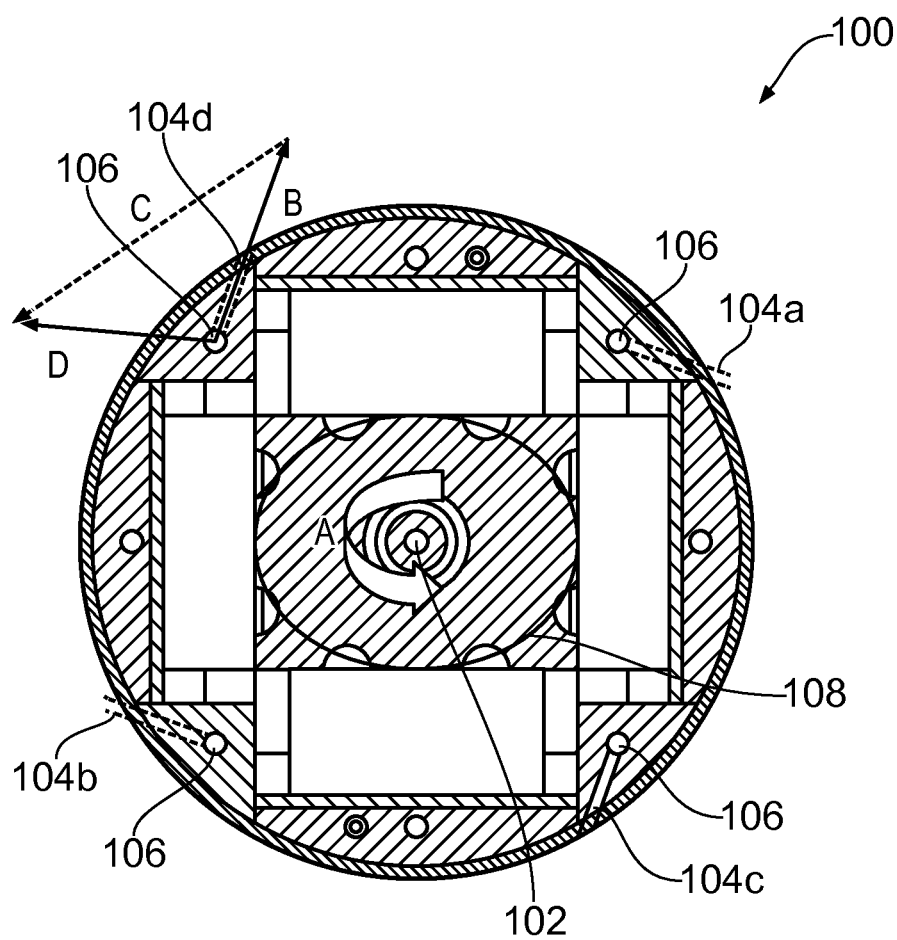
FIG. 1 shows a rotor in accordance with an embodiment of the present invention.

FIG. 1 illustrates an end of a rotor 100 according to the present invention. The rotor 100 may be provided in a generator commonly driven by, and in some cases used to drive, i.e. start, an aircraft engine. The rotor 100 is arranged to rotate around a central axis 102, for example, in the direction of arrow A. The rotor 100 comprises a plurality of jets 104a-d, or some other fluid expulsion means, positioned around the circumference of the rotor 100, generally at or adjacent its outer circumferential surface. Fluid is fed into the jets 104a-d via a number of distribution channels 106, which extend longitudinally along the rotor 100, as shown in more detail by FIG. 4. In the illustrated example, there are shown four jets 104a-d and four respective distribution channels 106, however, the rotor 100 may comprise two or more jets 104a-d and respective distribution channels 106 according to the present invention. It should be appreciated that each distribution channel 106 may distribute fluid to a plurality of jets 104a-d, which may be disposed in an array extending along the rotor 100 in an axial direction. In this respect, the plurality of jets 104a-d could be located anywhere along the length of the rotor 100, but in most cases would be located toward the ends of the rotor 100, outside of the stator core (not shown) within which the rotor 100 is located, since generally it is undesirable to introduce coolant into the air gap between the rotor 100 and the stator. In use, the jets 104a-d are arranged to release a fluid in order to cool the stator (not shown) arranged outside the rotor 100. The fluid may be any suitable coolant fluid, for example, oil that has been cooled by a cooling system.

As discussed above, the jets 104a-d are configured so that fluid is released from the rotor 100 at an angle, for example, in the opposite direction to the rotation of the rotor 100. For example, in FIG. 3, the jets 104a, d are shown as extending from the distribution channel 106 at an angle to the radius of the rotor 100 (i.e. towards the page). Similarly, in FIG. 4, one jet 104c is shown as extending from the distribution channel 106 at an angle to the radius of the rotor 100 (i.e. away the page), whilst only the jet inlet 104d' in the distribution channel 106 can be seen for the specific portion of the rotor 100 shown.

As the rotor 100 rotates, the fluid is ejected from the jets 104a-d in a non-radial direction, at a non-zero angle to a tangent of the rotor 100, and oriented away from the direction of rotation of the rotor 100, for example, in the direction of arrow B. This partially counteracts the radial component of the rotor velocity, illustrated by arrow C, so as to minimise the absolute velocity of the fluid, illustrated by arrow D, as it is released from the rotor 100. This reduction in the absolute velocity imparted to the fluid leaving the rotor 100 helps to reduce the amount of kinetic energy of the rotor 100 being lost to the fluid as it leaves the rotor 100, thus minimising the mechanical power consumption by the rotor 100.

As discussed above, in variable frequency generators, it is difficult to vary the jet velocity in order to counteract the continuously varying rotational velocity of the rotor 100. As such, the present invention seeks to provide a way of selectively distributing the fluid to the jets 104*a-d* in dependence on the rotational velocity of the rotor 100.

One solution to this would be for the jet nozzle to dilate at lower speeds, enabling the fluid velocity to be varied in dependence on the rotational speed of the rotor 100. This can help to minimise power consumption. However, in practice, it is likely that the large centrifugal forces generated at high rotational speeds of the rotor 100, in particular in aircraft engine applications, would be likely to damage or render inoperable any such mechanism. An alternative solution would be to use a valve mechanism to selectively turn one or more of the jets 104*a-d* on and off to match the fluid velocity of the operating jets 104*a-d* to the rotational velocity of the rotor 100. Fewer jets 104*a-d* operating will result in more fluid flowing through those still in operation, thereby raising the velocity of those jets 104*a-d*.

However, this is again difficult to put into practice in generators where the rotor speed is constantly changing. Operating a reduced number of jets 104 *a-d* at higher rotational speeds of the rotor 100 can therefore be beneficial. However, creating valve mechanisms which can be operated on the rotor 100 and which can withstand the high centrifugal forces is challenging.

Figure 2:
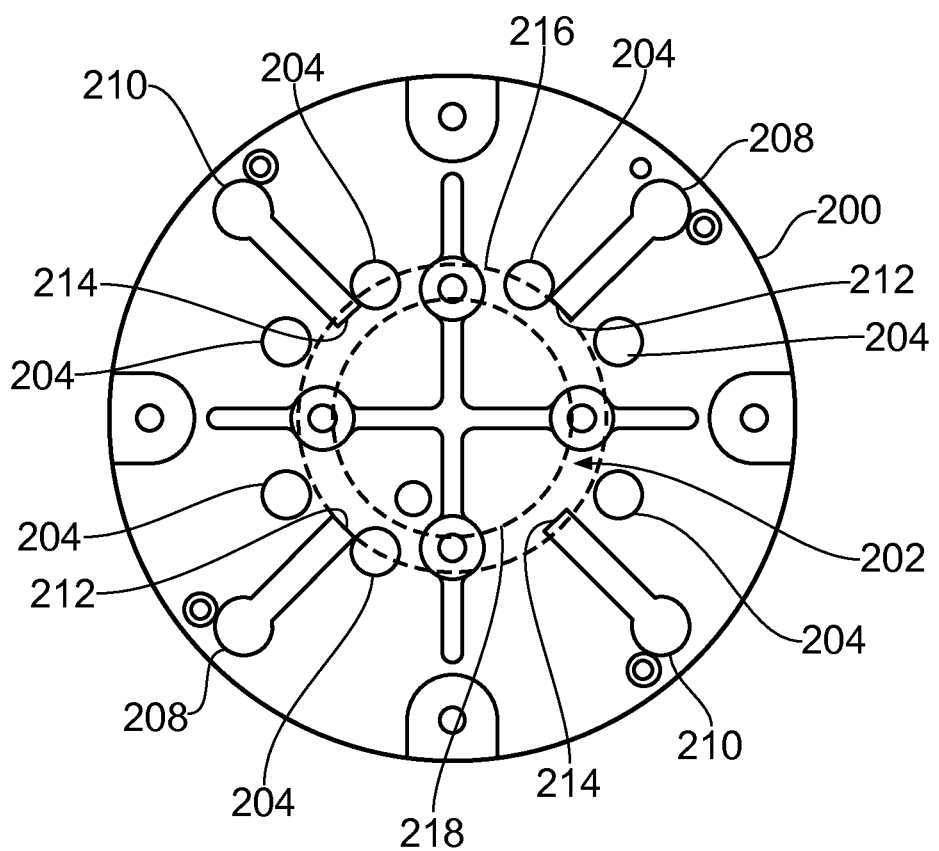
FIG. 2 shows a part of a rotor in accordance with an embodiment of the present invention.
Figure 3:
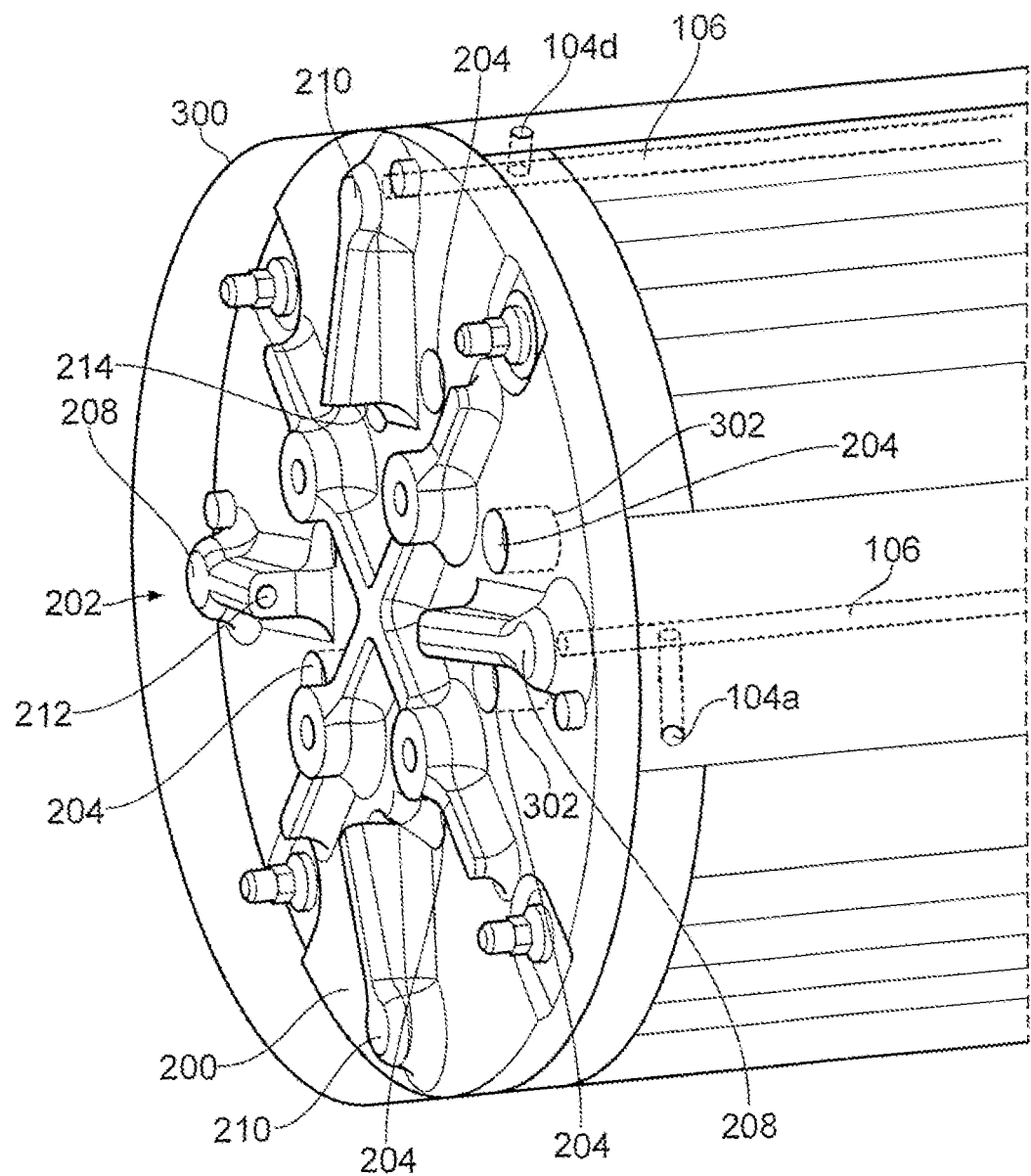
FIG. 3 shows a rotor in accordance with an embodiment of the present invention.
Figure 4:
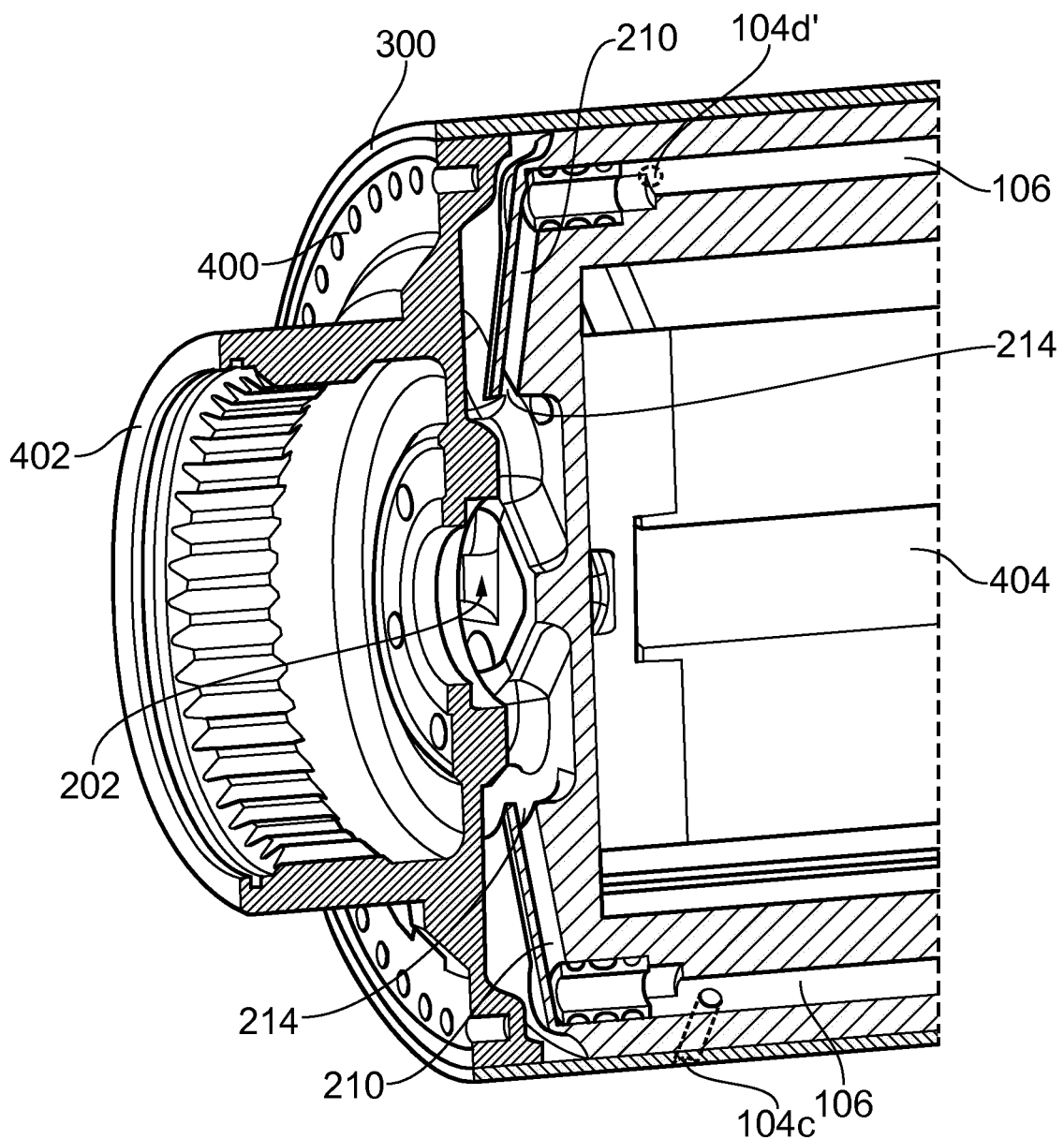
FIG. 4 shows a rotor in accordance with an embodiment of the present invention.

A further solution is illustrated by FIGS. 2 to 4, in which the rotor 100 is provided with an end plate 200 which is configured to selectively direct fluid into the jets 104*a-d*. As shown in FIG. 4, the rotor 100 comprises an end cap 400 and a drive shaft connection 402, which together with the end plate 200 enclose a cavity 202 within the end of the rotor 100. As such, the end plate 200 defines a longitudinally inner wall of the cavity 202. The end cap 400 and drive shaft connection 402 arrangement define a longitudinally outer wall of the cavity 202, and the outer skirt or sleeve 300 of the rotor 100 defines a radial wall of the cavity 202.

In the illustrated embodiment, fluid is fed into the cavity 202 via one or more inlets 204, which may be in fluid communication with at least one channel 404 running through the interior of the rotor 100. However, it will be appreciated that fluid may be fed into the cavity 202 from another direction, for example, via the end cap 400.

Fluid in the cavity 202 is fed to the distribution channels 106 via a number of respective fluid paths 208, 210. Each fluid path 208, 210 can be provided with an inlet opening 212, 214 within the cavity 202 and at least one jet 104*a-d*, which may be in fluid communication with the inlet opening 212, 214 via one of the distribution channels 106. In the illustrated embodiment, the fluid paths 208, 210 are shown as substantially radially oriented standpipes, however, it will be appreciated that any suitable fluid conduit may be used and its path from its respective radially inwardly located inlet 212, 214 to its respective radially outwardly located outlet or jets 104*a-d* may not be in the form illustrated.

In prior art systems, the fluid paths feeding the distribution channels 106 and jets 104*a-d* are fed from a point that is equidistant from the rotational axis 102 to ensure that all jets 104*a-d* are given an equal flow rate. However, in variable frequency generators, this can result in very high mechanical power consumption by the rotor 100 if sufficient flow rates at low rotational speeds are to be achieved, as discussed above. In embodiments of the present invention, the end plate 200 comprises a first set of fluid paths 208 and a second set of fluid paths 210, wherein the openings 212 of the first set of fluid paths 208 are further away from the rotational axis 102 than the openings 214 of the second set of fluid paths 210. By placing the openings 212 of the fluid paths 208, 210 at different radial positions on the end plate 200, fluid is distributed to the fluid paths 208, 210 in dependence on the rotational velocity of the rotor 100. This is described in further detail in the following.

In the illustrated embodiment, the first set of fluid paths 208 are shorter in a radial direction than the second set of fluid paths 210 in order to provide the openings 212 at different radial positions, with all jets 104*a-d* being at the same radial position. However, in an alternative configuration, the first set of fluid paths 208 and second set of fluid paths 210 may be the same length, but with the first set of fluid paths 208 instead being set further radially outward than the second set of fluid paths 210 to again provide the openings 212 at different radial positions.

Generators are typically designed with a restrictor 302 on the rotor fluid inlet 204 to ensure that the rotor 100 receives a constant flow rate of fluid independent of the speed at which the rotor 100 is rotating. In the illustrated embodiment, four fluid paths 208, 210 are used as flow dividers, each of which is only partially filled with fluid. The depth of fill will vary with speed, and hence centrifugal pressure, to ensure that a constant jet outlet pressure and hence flow rate is maintained, in order to match the flow into and out of the fluid path 208, 210 and jet 104*a-d* arrangement. As such, the system will use the first set of fluid paths 208 as flow dividers until each is fully filled. Once the first set of fluid paths 208 are filled, the fluid depth in the cavity 202 will increase slightly until the second set of fluid paths 210 becomes available to act as an overflow. As the speed continues to drop, the overflow fluid paths 210 keep the depth of fluid constant but the centrifugal pressure will drop off, causing the jet velocity in the first set of fluid paths 208 to decrease, diverting more of the flow to the second set of fluid paths 210.

When the generator is rotating at high speed, for example, above cruising speed, it will be appreciated that the fluid creates an effective surface within the cavity 202, which is substantially concentric with the outer surface of the generator and cavity 202. As the speed of the rotor 100 increases, the centrifugal force created by the rotor 100 increases the centrifugal pressure in the cavity 202, which in turn causes the equilibrium position which the surface of the fluid reaches in the cavity 202 to move outwards in the radial direction, creating an air bubble in the centre of the cavity 202, as illustrated by circle 216 on FIG. 2. At sufficiently high speeds, for example, at cruise speed, all of the fluid exits the cavity 202 down the first set of fluid paths 208 having an inlet opening 212 further away from the rotational axis 102 and into the jets 104*a-b* of these shorter fluid paths 208. That is to say, the fluid surface is forced beyond the inlet openings 214 of the longer fluid paths 210 such that no fluid is fed to the respective jets 104*c-d*. As only half of the jets 104*a-b* are being fed with fluid, this will double the speed at which fluid leaves the rotor 100, reducing the net velocity of the fluid and hence power consumption. As will be appreciated, different ratios of overall outlet area between the respective sets of jets 104*a-b*, 104*c-d* can be provided to provided differing velocity ratios of the fluid in dependence on whether one or more sets of jets 104*a-d* are being fed or not.

As the rotor speed is reduced, for example, below cruising speed, the centrifugal force and hence the centrifugal pressure will decrease, thereby reducing the velocity of the jets 104*a-b*. As the jet velocity decreases, the depth of fill in the first set of fluid paths 208 increases until they are completely full, at which point the depth of fluid in the cavity 202 will start to increase. As such, the concentric fluid surface created in the cavity 202 will move inwardly in the radial direction, reducing the size of the central air bubble in the cavity, as illustrated by circle 218 on FIG. 2, such that fluid will also reach the openings 214 of the longer fluid paths 210 and thus be distributed to all four jets, or sets of jets 104*a-d*. This will reduce the flow rate required through each jet 104*a-d* in order to maintain a sufficient flow through the rotor 100, thus enable effective cooling of the rotor 100 even at the reduced levels of pressure available required to drive the fluid out at lower speeds. This can help to ensure that the velocity at which fluid is expelled is better matched to the rotational velocity of the rotor 100 at both higher and lower rotational speeds.

As one example, the fluid paths 208, 210 may be configured such that the longer fluid paths 210 only come into operation when the rotor 100 is rotating below cruising speed. As such, the jets 104*a-b* are optimised for efficiency at cruising speed, with the jets 104*c-d* coupled to the longer fluid paths 210 only being used when the rotor 100 is operating below this speed (for example, take-off, landing, ground taxiing), which is generally a much smaller proportion of the total time an aircraft is in operation.

In the illustrated example, the rotor 100 comprises two sets of jets 104*a-d*, however, it will be appreciated that the rotor 100 may comprises a number of further sets of jets, each being configured to come into operation at different rotational speeds. For example, the rotor 100 may comprise a third set of jets connected to a fluid path having an inlet opening that is closer to the rotational axis 102 than that of the first and second sets of fluid paths 208, 210.

The difference in the distances from the rotational axis 102 to the shorter fluid paths 208 and the longer fluid paths 210 is relatively small, for example, between 1 and 2 mm in some examples, which can ensure that the longer fluid paths 210 come into operation almost immediately after the shorter fluid paths 208 are fully flooded.

In the illustrated embodiment, four fluid paths 208, 210 are shown, however, it will be appreciated that any number of fluid paths may be provided as long as there are at least two sets of fluid paths at two or more different radial positions.

Preferably, the diameter of the jets 104*a-d* are tuned to match the rate of fluid flow and the depth of the fluid paths 208, 210. For example, if the hole size of the jets 104*a-d* is not properly configured to achieve the desired flow from the first and second sets of jets 104*a-d*, the longer fluid paths 210 could come into operation only at or near the minimum speed of the generator, and thus the benefits realised may be minimal. One way to solve this is to reduce the hole diameter of the jets 104*a-d* slightly, which would also further optimize the jet power consumption. An alternative solution would be to shorten the fluid paths 208, 210, in which case the flow path from the rotor windings to the cavity 202 via the inlet 204 or inlets needs to be at a point that is radially inwards of the inner most part of the rotor windings to ensure that the windings remain fully submerged in fluid, as shown by fluid level 108 in FIG. 1. Such an arrangement would therefore act as a weir.

One alternative method of selectively directing fluid to different sets of jets may be to provide at least two sets of jets, each set of jets being fed fluid by a different source. In this respect, the rotor 100 may have two or more concentric fluid feeds through the middle axis 102 of the rotor 100 and routed to different sets of jets by a valve means located outside of the rotor 100, and thus protected from the centrifugal forces. This routing may be achieved, for example, using a solenoid valve actuated by a control unit measuring the electrical frequency of the generator.

Alternatively, the fluid may be selectively directed to different sets of jets by way of valve means located between the fluid inlet or inlets and the distribution channel of at least one set of jets, whilst at least one other set of jets is continuously fed fluid at all times.

Figure 5A:
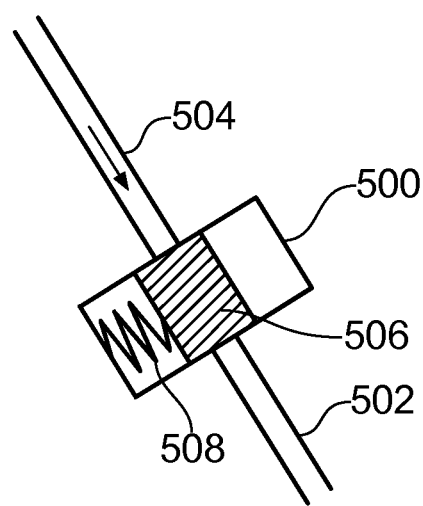
FIGS. 5A-B illustrate a first mechanism for use in the present invention.
Figure 5B:
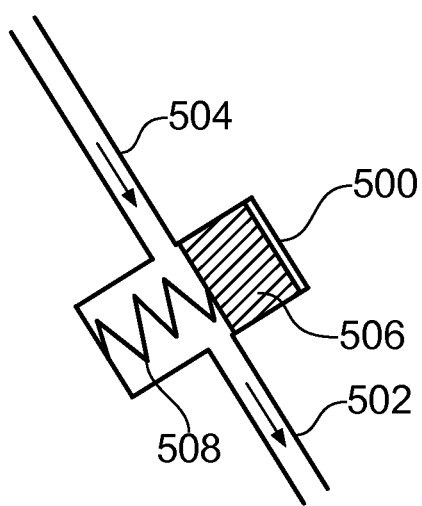

FIGS. 5A and 5B illustrate one example valve mechanism 500 located between a distribution channel 502 of one or more jets and a fluid path 504 from the inlet or inlets of the rotor. The valve 500 comprises a moveable body 506 that is biased towards an open position, as shown in FIG. 5B, by a biasing means, shown in this example as a spring 508. At high speeds, the centrifugal forces act against the spring 508 and push the body 506 into a closed position, as shown in FIG. 5B, such that it blocks the flow of fluid from the inlet fluid path 504 to the distribution channel 502. As such, fluid may only be directed to the jet or jets that are not provided with any sort of valve mechanism. As the speed of the rotor decreases, the centrifugal force acting against the valve 500 decreases. The force of the spring 508 will eventually overcome the centrifugal force, thereby pushing the body 506 back towards the open position shown in FIG. 5B such that fluid then flows from the inlet fluid path 504 to the distribution channel 502. Consequently, fluid is directed to all sets of jets in order to compensate for the reduction in rotational velocity.

Figure 6A:
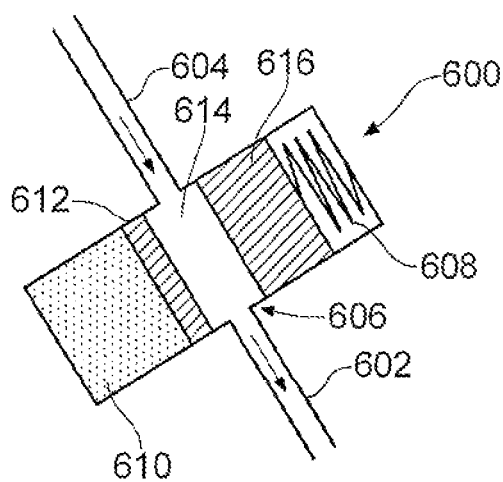
FIGS. 6A-B illustrate a second mechanism for use in the present invention.
Figure 6B:
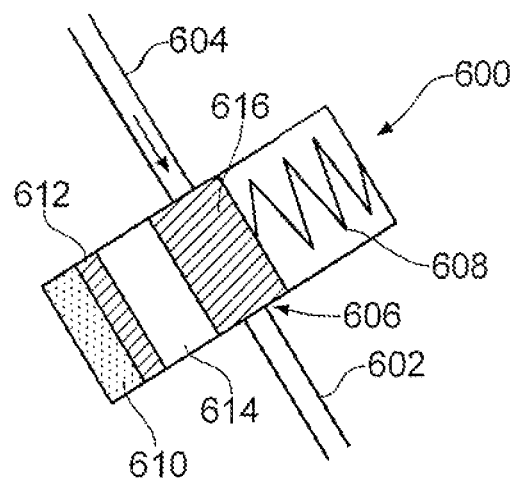

In certain circumstances, it may be desirable to control the flow to one or more of the sets of jets in dependence on another functional parameter of the rotor, such as a temperature. At low speeds, the rotor may generate more heat than at higher rotational speeds, due to increased currents being required to provide a same power output at relatively lower rotational speeds. FIGS. 6A and 6B illustrate a second example valve mechanism 600 located between a distribution channel 602 of one or more jets and a fluid path 604 from the inlet or inlets of the rotor, wherein the valve 600 is temperature actuated. The valve 600 comprises a moveable body 606 comprising a cavity 614 between first and second opposing walls 612, 616. The valve 600 may comprise a biasing means, shown in this example as a spring 608, which acts upon the second wall 616 so as to bias the body 606 towards a closed position, as shown in FIG. 6B. The valve 600 comprises a thermally expanding material 610 such as a wax 610 adjacent to the first wall 612 of the moveable body 606.

The resulting increase in temperature in the rotor can be used to actuate the valve mechanism of FIGS. 6A and 6B by causing the volume of the wax 610 to increase. The wax 610 consequently pushes against the first wall 612 so as to compress the spring 608, and thereby pushes the body 606 into an open position, as shown in FIG. 6A, such that fluid then flows from the inlet fluid path 604 to the distribution channel 602. Consequently, fluid is directed to one or more additional sets of jets through the valve in order to compensate for the increase in temperature of the rotor.

As the speed increases, or as more fluid flows through the rotor, the temperature of the rotor may decrease and so the wax 610 may return to its original volume, thereby allowing the spring 608 to bias the body 606 into the closed position shown in FIG. 6B. As such, in this case, fluid may be only directed to the jet or jets that are not closed off by any valve mechanism.

Various modifications, whether by way of addition, deletion and/or substitution, may be made to all of the above described embodiments to provide further embodiments, provided that these further embodiments are encompassed by the appended claims.

The invention claimed is:

1. A generator arranged to be driven by an aircraft engine, the generator comprising:
   a rotor comprising:
      a rotor inlet for receiving a fluid;
      a plurality of outlets configured to release the fluid from a radially outer region of the rotor; and
      a fluid distribution arrangement arranged to direct fluid from the rotor inlet to one or more of the plurality of outlets;
      wherein the fluid distribution arrangement is configured to selectively distribute fluid to the plurality of outlets in dependence on an operational parameter of the rotor, wherein fluid is distributed to a first subset of the plurality of outlets when the operational parameter is above a first threshold value, wherein fluid is further distributed to a second subset of the plurality of outlets when the operational parameter is below the first threshold value, wherein the generator further includes a restrictor configured to provide a constant flow rate of fluid at the rotor inlet, independent of a velocity at which the rotor is rotating, and wherein the constant flow rate of fluid received at the rotor inlet is divided between the first subset of the plurality of outlets, or the first and second subset of the plurality of outlets, such that the velocity at which the fluid is released from the plurality of outlets varies with the operational parameter.

2. The generator according to claim 1, wherein the fluid distribution arrangement is configured to:
   distribute the fluid to the first subset of the plurality of outlets when the operational parameter of the rotor is within a first range of values; and
   distribute the fluid to the second subset of the plurality of outlets when the operational parameter of the rotor is within a second range of values.

3. The generator according to claim 2, wherein the fluid distribution arrangement is configured to distribute the fluid to both the first and second subsets of the plurality of outlets when the operational parameter of the rotor is within the second range of values.

4. The generator according to claim 2, wherein the first range of values is above the first threshold value.

5. The generator according to claim 2, wherein the second range of values is below the first threshold value.

6. The generator according to claim 2, wherein the fluid distribution arrangement is configured to distribute the fluid to a third subset of the plurality of outlets when the operational parameter of the rotor is within a third range of values.

7. The generator according to claim 6, wherein the third range of values is below a second threshold value, the second threshold value being below the first threshold value.

8. The generator according to claim 1, wherein the operational parameter of the rotor is the rotational velocity of the rotor.

9. The generator according to claim 1, wherein the fluid distribution arrangement comprises a cavity for receiving fluid from the rotor inlet.

10. The generator according to claim 9, wherein the fluid distribution arrangement comprises a plurality of fluid paths configured to direct fluid from the cavity to the plurality of outlets.

11. The generator according to claim 10, wherein at least one of the plurality of fluid paths comprises an inlet opening for receiving fluid from the cavity.

12. The generator according to claim 10, wherein the fluid distribution arrangement comprises a first set of fluid paths configured to direct fluid to the first subset of the plurality of outlets, and a second set of fluid paths configured to direct fluid to the second subset of the plurality of outlets.

13. The generator according to claim 12, wherein the first set of fluid paths comprises a first set of inlet openings arranged at a first radial position within the cavity, and wherein the second set of fluid paths comprises a second set of inlet openings arranged at a second radial position within the cavity.

14. The generator according to claim 13, wherein a radial distance of the first set of inlet openings from an axis of rotation of the rotor is greater than a radial distance of the second set of inlet openings from the axis of rotation of the rotor.

15. The generator according to claim 12, wherein the first subset of outlets are arranged at different circumferential positions on the rotor to the second subset of outlets.

16. The generator according to claim 1, wherein the plurality of outlets comprise a jet configured to eject fluid from the rotor.

17. The generator according to claim 1, wherein the rotor comprises a plurality of inlets for receiving fluid.

18. An aircraft engine comprising the generator according to claim 1.

19. An aircraft comprising the aircraft engine according to claim 18.

* * * * *